United States Patent
Tao et al.

(10) Patent No.: US 7,510,745 B2
(45) Date of Patent: Mar. 31, 2009

(54) METHODS FOR COATING CONDUCTING POLYMER

(75) Inventors: Xiao-ming Tao, Hung Hom (CN); Mei-yi Leung, Hung Hom (CN); Yang Li, Hung Hom (CN); Xiao-yin Cheng, Hung Hom (CN); Joanna Tsang, Hung Hom (CN); Chun-wah Marcus Yuen, Hung Hom (CN)

(73) Assignee: The Hong Kong Polytechnic University, Hong Kong SAR (CN)

( * ) Notice: Subject to any disclaimer, the term of this patent is extended or adjusted under 35 U.S.C. 154(b) by 485 days.

(21) Appl. No.: 11/222,179

(22) Filed: Sep. 9, 2005

(65) Prior Publication Data

US 2007/0065586 A1    Mar. 22, 2007

(51) Int. Cl.
*B05D 5/12* (2006.01)
*B05D 1/02* (2006.01)
*B05D 1/26* (2006.01)
*B05D 1/28* (2006.01)
*B05D 1/36* (2006.01)
*B05D 3/00* (2006.01)

(52) U.S. Cl. ............... 427/407.1; 427/398.1; 427/421.1; 427/427.4; 427/428.01; 427/412; 427/350

(58) Field of Classification Search ............ 427/407.1, 427/398.1, 421.1, 427.4, 428.01, 412, 350
See application file for complete search history.

(56) References Cited

U.S. PATENT DOCUMENTS

| | | | | |
|---|---|---|---|---|
| 5,108,829 A | * | 4/1992 | Kuhn | 442/115 |
| 5,240,644 A | * | 8/1993 | Barry et al. | 252/500 |
| 5,716,893 A | * | 2/1998 | Child | 442/63 |
| 5,833,884 A | * | 11/1998 | Child | 252/500 |
| 6,191,013 B1 | * | 2/2001 | Hahn et al. | 438/523 |
| 6,384,121 B1 | * | 5/2002 | Barbee et al. | 524/445 |

OTHER PUBLICATIONS

Kudoh, Yasuo, "Properties of polypyrrole prepared by chemical polymerization using aqueous solution containing $Fe_2(SO_4)_3$ and anionic surfactant," Synthetic Materials 79 (1996) 17-22.*

Satoh et al., "Highly conducting polypyrrole prepared from homogeneous mixtures of pyrrole/oxidizing agent and its applications to solid tantalum capacitors," Synthetic Metals, vol. 65, Issue 1, Jul. 1994, pp. 39-44 (abstract).*

* cited by examiner

*Primary Examiner*—William Phillip Fletcher, III
(74) *Attorney, Agent, or Firm*—Buchanan Ingersoll & Rooney PC

(57) ABSTRACT

Polypyrrole (PPy) is one of the most commonly studied conducting polymers due to its good stability, high conductivity, ease of preparation and non-toxicity. The stability of the conductivity of polypyrrole films depends on the choice of dopant anion, the method of preparation, and the conditions of aging. Most of the existing methods only improve stability by sacrificing conductivity, as well as sensitivity. This invention provides a method for coating conducting polymer onto a substrate by first applying an anionic dopant and an oxidizing agent onto the substrate. The monomer is then allowed to form the conducting polymer at about −10 to −80° C. for a sufficient period of time. After storage for a long period of time (nearly a year), the conductive polymer coating still retains almost the same strain sensitivity and at least up to 85% of its initial conductivity.

25 Claims, 1 Drawing Sheet

METHODS FOR COATING CONDUCTING POLYMER

FIELD OF THE INVENTION

This invention relates to methods of coating conducting polymer onto a substrate, particularly fabrics, more particularly elastic fabrics.

BACKGROUND OF THE INVENTION

Polypyrrole (PPy) is one of the most commonly studied conducting polymers due to its good stability, high conductivity, ease of preparation and non-toxicity. It has been found with wide applications in the field of chemical sensors (L. Ruangchuay et al, 2004, K. Suri et al, 2002), electromagnetic interference shielding devices (C. Y. Lee et al, 2002), electrochromic devices (O. Inganas et al, 2001) and batteries (R. P. Ramasamy et al, 2003). But chemically or electrochemically synthesized conducting polymer films have poor mechanical properties, which hinder their applications as strain sensors. This limitation may be overcome by polymerization of polypyrrole on a textile substrate. A summary of polymerisation of polypyrrole is provided in the article of "Handbook of Conductive Polymers" by G. B. Bryan et. al. Polypyrrole can be fabricated by either an electrochemical process where pyrrole is oxidized on an anode to a desired polymer film, or oxidized chemically with oxidizing agents on a substrate.

However, the flexible strain sensors exhibit low sensitivity and unsatisfying stability. D. D. Rossi et al. in Material Science Engineering, C, 7(1), 31-35 (1998); Dresswear: Wearable Hardware, introduced an idea of measuring movement of body segments using conductive polymer. A sensorized glove based on the sensing fabrics of polypyrrole coated Lycra/cotton was developed, but the sensor aged severely in air and the conductivity decreased continuously. Furthermore, the saturation of the sensor occurred at a small strain of about 6%, which may be not useful. K. W. Oh et al. reported that the PPy-coated Nylon-spandex was sensitive to strain change having a deformation of 50%, but the strain sensitivity is as small as not more than 2 (J. App. Polym. Sci. 2003). X. P. Jiang et al. (J. Biomed. Mater. Res. 2002) also proposed the PPy-coated PET/Spandex can be used as a strain sensor for a large deformation of up to 50%, while the strain sensitivity is only 3. Therefore, the use of conducting polymer for fabricating high technical and smart flexible textiles is still limited. Important limitations of the use of conducting polymer include lack of conductivity stability and control of strain sensitivity.

The stability of the conductivity of polypyrrole films, prepared either electrochemically or chemically, has been discussed in numerous publications. J. C. Thieblemont et al. have published several papers including: Stability of chemically synthesized polypyrrole films (Synthetic Metals 59, (1993) 81-96), and Kinetics of Degradation of the Electrical Conductivity of Polypyrrole under Thermal Aging (Polymer Degradation and Stability 43, (1994) 293-298). In addition, V. T. Truong has published several studies including Thermal Stability of Polypyrroles (Polymer International 27, (1992) 187-195). In their findings the conductivity of polypyrrole films, powders, and coatings decreases over time according to either a diffusion controlled process or a first-order decay process. The rate of decay is related to the choice of dopant anion, the method of preparation, and the conditions of aging. The decay is significantly more rapid in the presence of air, indicating that the reaction of oxygen with the polymer backbone may be responsible for a significant portion of the conductivity loss.

Researchers have studied the stability of polypyrrole films and the control of thermal stability of the conductive films. Thermal treatment, nitrogen treatment, oxygen treatment, acid and base treatment, uses of dopants as well as voltage applied have been proved to improve the stability of the polypyrrole films. However, most of the methods described above only improve stability by sacrificing conductivity, as well as sensitivity.

OBJECTS OF THE INVENTION

Therefore, it is an object of this invention to provide a method of coating conducting polymer onto a substrate with improved stability while conductivity and sensitivity is maintained. Another object of this invention is to resolve at least one or more of the problems as set forth in the prior art. As a minimum, it is an object of this invention to provide the public with a useful choice.

SUMMARY OF THE INVENTION

Accordingly, this invention provides a method for coating polypyrrole onto a substrate. An anionic dopant and an oxidizing agent are first applied onto the substrate. Then the substrate is coated with pyrrole and the pyrrole is allowed to form the conducting polymer at about −10 to −80° C. for a sufficient period of time. Finally, the residue compounds are removed.

Preferably, the anionic dopant is selected from the group consisting of dodecylbenzenesulfonate, p-toluene sulfonate, naphthalene sulfonate, p-nitrophenol, 2-naphthalene-sulfonate and m-sulfobenzoate. More preferably, the anionic dopant is dodecylbenzenesulfonate.

The anionic dopant may be in an amount of 0.6 to 4.4 weight %, and more preferably 2.2 weight %.

The oxidizing agent may be selected from the group consisting of iron (III), copper (II), and silver (I) compounds. The oxidizing agent is in an amount of 5 to 25 weight %, and more preferably 15 weight %.

Preferably, the monomer is allowed to form the conducting polymer for 24 to 72 hours.

Optionally, the anionic dopant and the oxidizing agent are applied onto the substrate by a technique selected from the group consisting of jet spray, screen printing, inkjet printing, or padding.

The substrate is selected from the group consisting of single knitted fabric and simple double knitted fabric. More preferably the substrate may be plain, lacoste or purl fabric, or alternatively, rib, milano, cardigan, interlock or warp knitted fabric.

The residue compounds may be removed by vacuum annealing. The vacuum annealing can be performed at a temperature of less than or equal to 100° C.

It is another aspect of this invention to provide a method for coating a conducting polymer formed by a monomer onto a substrate, including the steps of:

applying dodecylbenzenesulfonate as an anionic dopant and an oxidizing agent onto the substrate;

coating the substrate with the monomer and allowing the monomer to form the conducting polymer for a sufficient period of time; and removing residue compounds.

BRIEF DESCRIPTION OF THE DRAWINGS

Preferred embodiments of the present invention will now be explained by way of example and with reference to the accompanying drawings in which.

DETAILED DESCRIPTION OF THE PREFERRED EMBODIMENT

Figure 1:
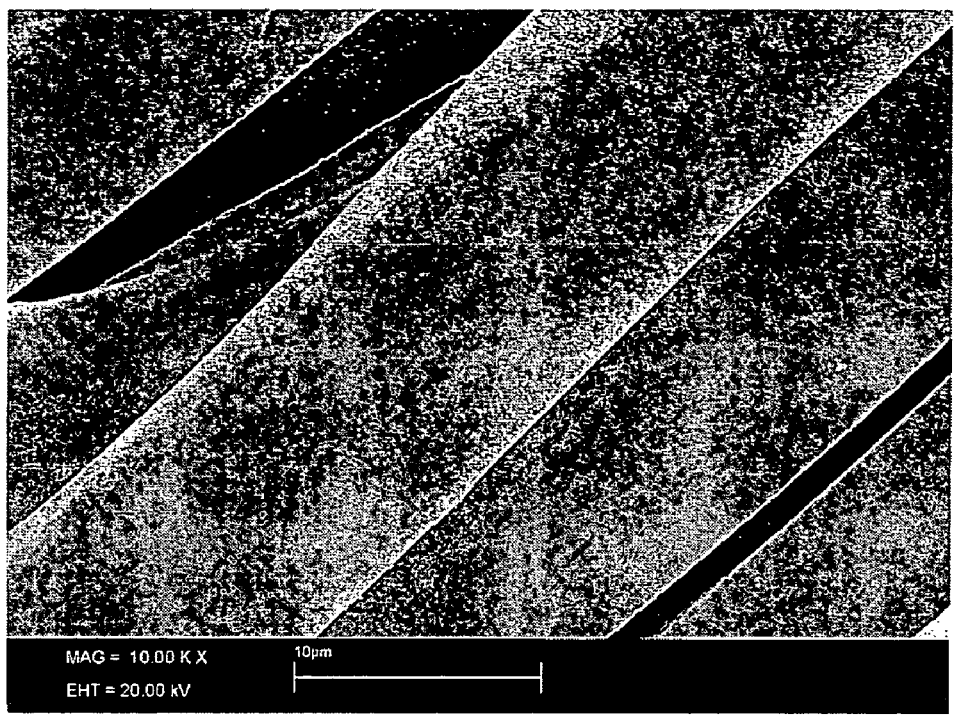
FIG. 1 shows SEM images of PPy-coated fabrics prepared by the method of this invention.

This invention is now described by way of example with reference to the figures in the following paragraphs.

Objects, features, and aspects of the present invention are disclosed in or are obvious from the following description. It is to be understood by one of ordinary skilled in the art that the present discussion is a description of exemplary embodiments only, and is not intended as limiting the broader aspects of the present invention, which broader aspects are embodied in the exemplary constructions.

This invention relates generally to new methods for coating conductive polymer onto a fabric substrate that can retain the stability in strain sensitivity and initial conductivity after storage for a long period of time. The methods of this invention involve the use of chemical vapour deposition method with polymerisation under a low temperature range (−10 to −80° C.). A thin but dense layer of conductive coating is deposited onto a textile fabric. The fabric is then coated with a densely oriented nano-layer of conductive polymer coating that provides high strain sensitivity and stability. The stability of the coating may further be enhanced by a vacuum annealing process at a relatively lower temperature (below 100° C.). After storage for a long period of time (nearly a year), the conductive polymer coating still retains almost the same strain sensitivity and at least up to 85% of its initial conductivity.

As stated above, various factors affect the stability, sensitivity, and conductivity of the conductive polymer coating formed, including the timing of the application of the oxidizing agents and/or dopants; molar ratio of oxidizing agent and the dopants; parameters for printing, padding, jet-spraying; and the temperature under which vapour chemical deposition is carried out. It is found in this invention that a well-oriented conductive polymer coating with smooth surface morphology can be produced using large anion dopants with low temperature deposition process. It is found that the stability and the strain sensitivity may be improved if either large anion dopant, for example dodecylbenzenesulfonate, or low polymerization temperature is used. On the other hand, much improved results may be obtained if both large anion dopant, for example dodecylbenzenesulfonate, or low polymerization temperature are used to manufacture the conducting polymer coating. By using the method of this invention, high density and thin layer of conductive film can be produced. The densely structured and thin conductive coating deposited on a stretched fabric may assist in improving its strain sensitivity under repeated large strain deformations (up to 50%). The combination of low-temperature deposition, large anion dopants application and the optional relatively lower temperature annealing process provides the newly developed fabric sensors with both stability in electrical, physical and mechanical properties, and most importantly retaining the initial conductivity and strain sensitivity of the fabric sensors.

Figure 2:
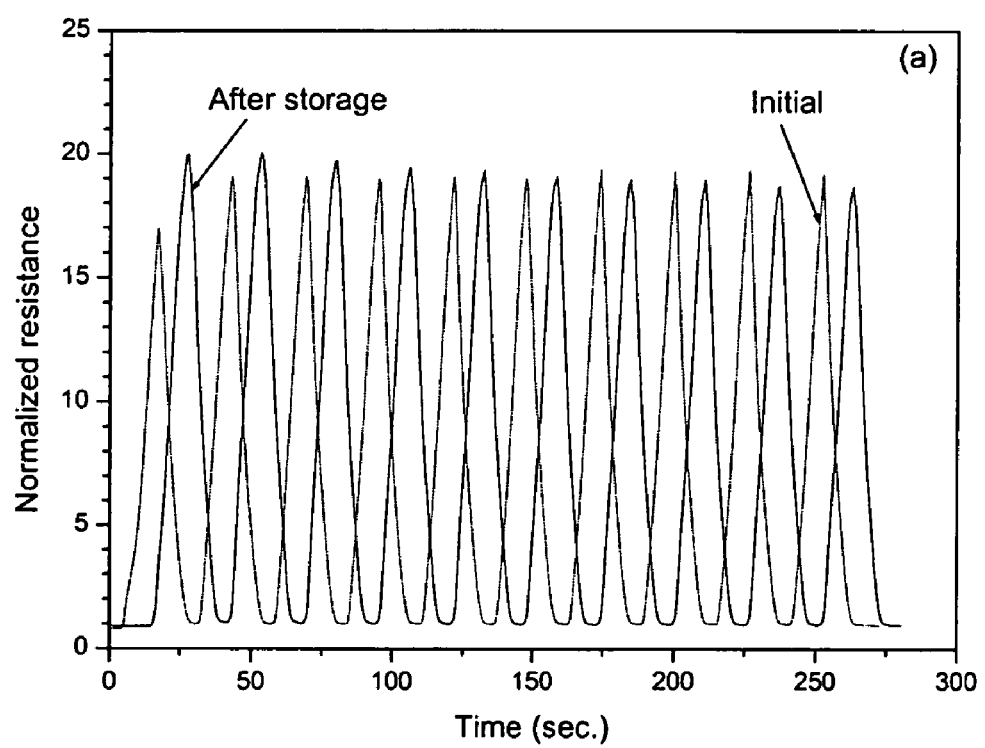
FIG. 2 shows the Conductivity change of PPy-coated fabrics of FIG. 1 after storage for nearly a year.

Fabrics coating with the conductive polymer of this invention may be used as strain fabric sensors with relatively high stability. An SEM photo of the strain sensor is shown if FIG. 1. The strain sensors are found to be repeatable and stable with respect to conductivity and strain sensitivity, even after being stored for one year. The strain sensitivity of the strain sensors of this invention can normally reach about 80. As shown in FIG. 2, the strain sensitivity of the strain sensor remains almost unchanged after being stored for one year.

The method of this invention first applies an oxidizing agent and the dopant onto the substrate.

Various dopant anions and oxidizing agents may be used. Suitable dopant anions include dodecylbenzenesulfonate, p-toluene sulfonate, naphthalene sulfonate, p-nitrophenol, 2-naphthalene-sulfonate or m-sulfobenzoic acid. Basically, dopants having a benzene ring, an aliphatic chain, and at least one anionic group may be used. The aliphatic chain may comprise 1 to 20 carbon atoms. The anionic group may be sulfonate, carboxylate, or hydroxide group.

Iron (III), copper (II), and silver (I) compounds may be used as the oxidizing agent. Suitable examples may include iron (III), copper (II), and silver (I) compounds like chlorides or nitrates.

The amount of the dopant anions may be in an amount 0.005M to 0.0165M. During padding, the concentration may be increased to 0.49 g/250 ml H2O to 2.94 g/250 ml H2O in padding. The printing concentration may be 1.09 g/200 g emulsion to 8.72 g/200 g emulsion.

The amount of the oxidizing agent may be in the order of 0.02M to 0.1165M. The padding concentration may be 3.38 g/250 ml 13.52 g/250 ml ethanol, and the printing concentration may be 15 g/200 g emulsion to 60 g/200 g emulsion.

The anionic dopant and the oxidizing agent may be applied onto the substrate by various techniques including jet spray, screen printing, inkjet printing, or padding. These are traditional methods used in the garment industry and one skilled in the art shall know these processes.

After the oxidizing agent and the dopant are applied onto the substrate, the pyrrole monomer is then deposited at a relatively low temperature of −10 to −80° C. Pyrrole is of course one of the suitable monomers. The monomer is then allowed to stay on the substrate to form the conducting polymer. Usually, 24 to 72 hours may be sufficient to form the conducting polymer.

After the polymer is formed, the residue compounds including the oxidizing agent, dopant anions, and the remaining monomers may be removed. These residues may be removed by a vacuum annealing process, which treats the coated fabric in vacuum. It is found that the stability of the conducting polymer coating may be further enhanced if the vacuum annealing process is conducted at a lower temperature range of less than 100° C., more preferably at about 40° C.

Various substrates may be used, including single knitted fabric, for example plain, lacoste and purl fabric, and simple double knitted fabric.

The invention will now be further illustrated and described with reference to various examples as summarised and then detailed below.

EXAMPLE 1

Fabrics comprising 83% Tactel and 17% lycra was first immersed into an aqueous solution containing sodium dodecyl benzene sulfonate and the ethanol solution of $FeCl_3$ with ratio 1:10, and the wet take-up, which is, the mass of the agent picked up in the fabric over the original fabric mass, after each immersion was controlled from 60% to 100% by using a padding machine.

The fabrics was then transferred with a beaker containing 10 ml pyrrole monomer were into a desiccator. The solvents on the wet fabric were evaporated under vacuum. The fabric was then put in a refrigerator where the temperature is kept at −10 to −40° C. Polymerization of polypyrrole proceeded on the surface of the fabrics under vacuum for 50 hrs. The resulting black fabrics were then washed with de-ionized water and ethanol, respectively, and dried at 40° C. under vacuum. The annealing was carried out by heating the dried fabrics at 60° C. for 40 hrs under vacuum.

EXAMPLE 2

A substrate (30 g) is padded with aqueous liquor at room temperature. One liter of the aqueous liquor contains the following constituents:

|  | Amount (g) |
|---|---|
| Wetting agent | 5 |
| Oxidizing agent (FeCl$_3$) | 54 |
| Dopant (DBS) | 6 |

The oxidizing agent and dopant dissolved in the water according to the above amounts. The resulting solution was then poured into a trough between two padding rollers and the uptake is adjusted to 70% on weight of the dry substrate. The fabric substrate was then passed through the nip of the rollers and the fabrics are collected.

After padding, pyrrole is coated onto the substrate by exposing the printed substrate, while it is still wet, to an atmosphere saturated with pyrrole monomer under vacuum condition at −10 to −30° C. temperature for 72 hours. Conducting polymer was then formed according to the procedures as in EXAMPLE 1.

EXAMPLE 3

A emulsion thickener paste is first prepared as follows:

|  | Amount (g) |
|---|---|
| Emulsifier AC | 20 |
| White Spirit | 750 |
| Water | 230 |

The emulsifier AC is first dissolved in water. White spirit is then added with high-speed stirring, which is continued until the mixture was thoroughly emulsified.

A print paste was then prepared for printing the oxidizing agent onto the fabric:

|  | Amount (g) |
|---|---|
| Emulsion thickener | 400 |
| Oxidizing agent (FeCl$_3$) | 43.2 |
| Dopant (DBS) | 4 |

The oxidizing agent was added in the emulsion thickener with continuous stirring until the oxidizing agent is totally dissolved. DBS is then added without phasing out the emulsion thickener.

The print paste consists of the emulsion thickener, DBS dopant and the oxidizing agent was then printed on the substrate by screen printing technique.

After printing, coating of pyrrole onto the substrate is carried out by exposing the printed substrate, while it is still wet, to an atmosphere saturated with pyrrole monomer vapor under vacuum condition at extreme low temperature for 50 hours.

EXAMPLE 4

The oxidizing agent was dissolved in a volatile solvent and the solution was jetted by the printing head of digital textile printer onto the substrate. As the volatile solvent together with the oxidizing agent reaches the surface, the solvent evaporates very quickly, leaving the oxidizing agent on the surface. A DBS solution is then jetted by the printing head on the substrate.

After the printing of oxidizing agent, dopants onto substrate, pyrrole monomer was deposited onto the substrate is carried out by exposing the printed substrate, while it is still wet, to an atmosphere saturated with pyrrole vapor under vacuum condition at −10 to −40° C. for 50 hours.

EXAMPLE 5

In this investigation, various experiments on vacuum drying and vacuum heat treatments were conducted. PPy-coated fabrics as prepared above were washed and vacuum-dried at 40° C. for 16 hours. Heat treatment was carried out under nitrogen atmosphere or vacuum at the temperature of 60° C. for 40 hours. This procedure may remove the residues of PPy, print pastes as well as other impurities present on the fabrics that might react with the polymer and speed up the ageing.

The experimental results of the properties of the PPy-coated fabrics with various vacuum drying and vacuum heat treatment conditions are shown in Table 1. Vacuum annealing is found to be able to improve the initial conductivity of fabrics coated with the conducting polymer, see the initial resistances of the treated samples with the untreated one. The resistances are reduced from 40% to 80% by different treatment methods.

TABLE 1

Initial resistance and strain sensitivity of PPy-coated samples subjected to different residue-removing treatments

| Sample No. | Treatment Method | | | Resistance ($R_o$) | Strain Sensitivity $\left(\dfrac{\Delta R}{\varepsilon_{max} R_o}\right)$ |
|---|---|---|---|---|---|
|  | Vacuum Drying | Nitrogen Heat Treatment | Vacuum Heat Treatment |  |  |
| S1 | — | — | — | 100K | 20 |
| S2 | ✓ | — | — | 20K | 60 |
| S3 | ✓ | ✓ | — | 40K | 240 |
| S4 | ✓ | — | ✓ | 20K | 110 |

Comparison among the strain sensitivities $$\left(\frac{\Delta R}{\varepsilon_{max} R_o}\right)$$

of samples under cyclic large strain deformation reveals that the fabrics treated with vacuum drying at 40° C. have significant increases in the strain sensitivity. The values of strain sensitivity for samples with and without vacuum drying are approximately 60 and 20, respectively, implying that vacuum drying can improve the strain sensitivity of conducting-polymer-coated fabrics. In addition, the employment of heat treatment process can further enhance the strain sensitivity of the PPy-coated e-sensor. The coated fabrics may be treated under nitrogen or vacuum. The PPy-coated fabric with the highest strain sensitivity of 240 at 50% deformation can be obtained by treated with the vacuum annealing and heat treatment under nitrogen atmosphere at 60° C. for 40 hours.

EXAMPLE 6

The effect of the addition of the dodecylbenzenesulfonate DBS ($C_{18}H_{29}NaO_3S$) dopant is investigated. DBS is non-toxic and thus suitable for treating textiles, which may contact with human skin directly.

The experimental results of the properties of the PPy-coated fabrics with and dopant application are shown in Table 2. It shows that the initial resistance of DBS applied and vacuum heat treated PPy-coated fabric is higher then the sample with only vacuum heat treatment. However, the strain sensitivity is higher if the sample is doped with DBS. Therefore, it reveals that DBS application may reduce the electrical conductivity but enhance the strain sensitivity of the PPy-coated fabrics.

TABLE 2

Initial resistance and strain sensitivity of PPy-coated samples with and without DBS dopant

| Sample No. | Vacuum Drying | Vacuum Heat Treatment | DBS Application | Resistance ($R_o$) | Strain Sensitivity $\left(\frac{\Delta R}{\varepsilon_{max} R_o}\right)$ |
|---|---|---|---|---|---|
| S1 | — | — | — | 100K | 20 |
| S4 | ✓ | ✓ | — | 20K | 110 |
| S5 | ✓ | ✓ | ✓ | 60K | 184 |

The addition of dopant DBS in the fabrication of the PPy-coated e-textile sensor shows a significant improvement of strain sensitivity. Textile sensor fabricated with DBS and subjected to vacuum heat treatment achieves a very high strain sensitivity of about 184 at 50% deformation. The sensing curves of DBS doped fabrics also show very good linearity and repeatability.

EXAMPLE 7

Effects of different polymerization methods on the properties of the conducting-polymer-coated are studied.

The first test is to pad chemical vapour deposition (CVD) at room temperature DBS and $FeCl_3$. The fabrics were firstly padded with of DBS aqueous solution and then padded with standardized take-up of ethanol solution of $FeCl_3$. Vapour phase polymerisation was then carried out under vacuum at −10° C. to −40° C. for 50 hours to fabricate the PPy-coated fabrics after padding process.

The fabric is then screen-printed with CVD at room temperature for 24 hours. White paste was prepared as above with white spirit, 40 mL water and 50 g emulsifier. 30 g of $FeCl_3$ was mixed with 200 g of the white paste, then the solution of 6.54 g of DBS in 30 mL of water was added into the mixture and then stirred to obtain a dark brown print paste. The fabrics were printed with the print paste and then conducted vapour phase polymerisation under vacuum at room temperature. All fabrics fabricated by different methods were then washed thoroughly, vacuum dried at 40° C. for 16 hours and finally vacuum heated at 60° C. for 40 hours.

The experimental results of the properties of the PPy-coated fabrics with and dopant application are shown in Table 3. The PPy-coated fabric prepared by padding with low temperature chemical vapour deposition (CVD) method exhibits the lower initial resistance and higher strain sensitivity when compared with high temperature CVD methods.

The stability of the PPy-coated fabrics is also improved after the coated fabric is stored for a long period of time. Table 3 presents the resistance of the sensor prepared by different fabrication methods and conditions before and after the storage of about nine months. It can be seen that the sensor prepared at padding with low temperature exhibits a conductivity loss of only around 15% after storage for 9 months. In contrast, other samples fabricated at room temperature show conductivity loss of 80%. Therefore, it is obvious that the flexible strain sensor of PPy-coated fabric at extremely low temperature CVD shows excellent long-term stability and the low temperature preparation improves the stability of the sensor.

TABLE 3

Resistance before and after long term storage of the fabrics prepared at different temperatures

| Preparation temperature | Initial resistance (k Ohm) | Resistance after storage (k Ohm) |
|---|---|---|
| Low temperature | 11.2 | 13.2 |
| Room temperature | 70.1 | 312 |

EXAMPLE 8

The effects varying the concentration of the oxidizing agent on the PPy-coated fabrics was investigated, which are shown in Table 4. The strain sensitivity (S) of the conductive fabrics only changes slightly from 44 to 49 when the content of $FeCl_3$ increases from 5% to 10% in every 200 g print paste, and the strain sensitivity is sharply increased to 94 when the content of $FeCl_3$ is increased from 10% to 15%. However, a further increase of the content of $FeCl_3$ to 22.5% leads to a very low strain sensitivity S of 10. It appears that using 15% w of $FeCl_3$ provides the best result.

TABLE 4

The effect of different concentrations of $FeCl_3$ on the strain sensitivity

| Content of $FeCl_3 \cdot 6H_2O^a$ | Strain sensitivity $S^b$ |
|---|---|
| 5% wt | 43 |
| 10% | 49 |
| 15% | 94 |
| 22.5% | 10 |

$^a$with respect to 200 g white paste;
$^b$deformation = 50%

EXAMPLE 9

Varying concentration of DBS may also affect the strain sensitivity of PPy-coated fabrics. The effects of varying the concentration of DBS on the strain sensitivity of the conductive fabrics are shown in Table 5. The strain sensitivity (S) of the conductive fabrics only changes slightly from 44 to 30 when the amount of DBS increases from 0.6% to 1.4% wt in every 200 g print paste, and S sharply increases to 119 when the content of DBS is increased to 2.2%. However, a further increase of the content of DBS to 2.7% and 4.4% only leads to lower strain sensitivities S of 55 and 37 respectively. It appears that using 22% w of DBS provides the best result.

TABLE 5

The effect of content of DBS on the strain sensitivity

| Content of DBS[a] | Strain sensitivity S[b] |
|---|---|
| 0.6% | 44 |
| 1.4% | 30 |
| 2.2% | 119 |
| 2.7% | 55 |
| 4.4% | 37 |

[a]with respect to 200 g white paste;
[b]deformation = 50%

EXAMPLE 10

In order to obtain the strain-sensing fabrics with good uniformity, the print paste is printed on the surface of the fabrics by using an automatic screen printing machine. The print paste may then be distributed uniformly on the fabrics. Table 6 shows the strain sensitivity S and initial resistance $R_0$ of three conducting-polymer-coated fabrics prepared in a batch of coated fabrics being coated with the conducting polymer under the same conditions. It can be seen that the fabrics exhibits quite similar strain sensitivity and the initial resistance. Considering the inherent variations in the structure and compositions of the Nylon/Lycra fabrics, the properties of the PPy-coated strain-sensing fabrics prepared by the method of this invention appears to be independent from the substrate being used.

TABLE 7

Strain sensitivity and the initial resistance of different fabric substrates

| Sample No. | Strain sensitivity S[a] | Initial resistance $R_0$ (KΩ) |
|---|---|---|
| 1 | 38 | 2.5 |
| 2 | 42 | 2.5 |
| 3 | 38 | 2.8 |

[a]Deformation = 50%

EXAMPLE 11

Low-temperature plasma treatment using $CF_4$ gas can create a layer of water-repellence coating on top of the conducting-polymer-coated fabric (McCord, M. G de. al. Journal of Applied Polymer Science, 2003, Allan G., de al. AUTEX Research Journal, 2002). Although the conductive polymer coating prepared by the method of this invention has a certain degree of water-repellence with the contact angle of 100°, the addition of low-temperature plasma treatment further enhances the water repellence properties with contact angle rise up to 120°. However, a slight influence on strain sensitivity was also found. The strain sensitivity is less regular and slightly lowered.

EXAMPLE 12

The Py-coated textile sensor prepared by the method of this invention does not appear to be affected by changes in temperature and humidity. However, the coating may still be water or aqueous solution. Encapsulating the stretched fabric sensor with a layer of water-proof but highly elastic materials such as HTPU (High temp. Polyurethane) may resolve this issue. This type of material is selected due to its water-proof nature and with high stretchability. Alternatively, water-proof gel coating may be used.

Thus it can be seen that the invention has outlined a variety of methods for the production of textile sensors by employing the low-temperature vapour deposition method. This allow the ultra-thin layer of conducting coating deposition on a stretched fabric for maintaining the high strain sensitivity to be formed. Further, conductivity of such fabrics remains steady for a long period of time.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A method for coating a substrate with a composition comprising an anionic dopant, an oxidizing agent, and pyrrole, the method comprising the steps of:
   (i) applying the anionic dopant in an amount of about 0.6 to 4.4 weight % of the total weight of the composition and the oxidizing agent in an amount of about 5 to 25% weight % of the total weight of the composition onto the substrate;
   (ii) coating the substrate with the pyrrole after step (i) and allowing the pyrrole to form a conducting polymer at about −10 to −80° C. for about 24 to 72 hours; and
   (iii) removing residue compounds after step (ii).

2. The method of claim 1, wherein the anionic dopant is selected from the group consisting of dodecylbenzenesulfonate, p-toluene sulfonate, naphthalene sulfonate, p-nitrophenol, 2-naphthalene-sulfonate and m-sulfobenzoate.

3. The method of claim 2, wherein the anionic dopant is dodecylbenzenesulfonate.

4. The method of claim 1, wherein the anionic dopant is in an amount of 2.2 weight % of the total weight of the composition.

5. The method of claim 1, wherein the oxidizing agent is selected from the group consisting of iron (III), copper (II), and silver (I) compounds.

6. The method of claim 1, wherein the oxidizing agent is in an amount of 15 weight % of the total weight of the composition.

7. The method of claim 1, wherein the anionic dopant and the oxidizing agent are applied onto the substrate by a technique selected from the group consisting of jet spray, screen printing, inkjet printing, or padding.

8. The method of claim 1, wherein the substrate is selected from the group consisting of single knitted fabric and simple double knitted fabric.

9. The method of claim 8, wherein the single knitted fabric is selected from the group consisting of plain, lacoste and purl fabric.

10. The method of claim 8, wherein the simple double knitted fabric is selected from the group consisting of rib, milano, cardigan, interlock and warp knitted fabric.

11. The method of claim 1, wherein the residue compounds are removed by vacuum annealing.

12. The method of claim 11, wherein the vacuum annealing is performed at a temperature of less than or equal to 100° C.

13. A method for coating a conducting polymer formed by a monomer onto a substrate, comprising the steps of:
   (i) applying dodecylbenzenesulfonate as an anionic dopant and an oxidizing agent onto the substrate;
   (ii) coating the substrate with the monomer after step (i) and allowing the monomer to form the conducting polymer for about 24 to 72 hours; and
   (iii) removing residue compounds after step (ii).

14. The method of claim 13, wherein the conducting polymer is formed at about −10 to −80° C.

15. The method of claim 13, wherein the anionic dopant is in an amount of 0.6 to 4.4 weight % of the total weight of the anionic dopant, the oxidizing agent, and the monomer.

16. The method of claim 15, wherein the anionic dopant is in an amount of 2.2 weight % of the total weight of the anionic dopant, the oxidizing agent, and the monomer.

17. The method of claim 13, wherein the oxidizing agent is selected from the group consisting of iron (III), copper (II), and silver (I) compounds.

18. The method of claim 17, wherein the oxidizing agent is in an amount of 5 to 25 weight % of the total weight of the anionic dopant, the oxidizing agent, and the monomer.

19. The method of claim 18, wherein the oxidizing agent is in an amount of 15 weight % of the total weight of the anionic dopant, the oxidizing agent, and the monomer.

20. The method of claim 13, wherein the anionic dopant and the oxidizing agent are applied onto the substrate by a technique selected from the group consisting of jet spray, screen printing, inkjet printing, or padding.

21. The method of claim 13, wherein the substrate is selected from the group consisting of single knitted fabric and simple double knitted fabric.

22. The method of claim 21, wherein the single knitted fabric is selected from the group consisting of plain, lacoste and purl fabric.

23. The method of claim 21, wherein the simple double knitted fabric is selected from the group consisting of rib, milano, cardigan, interlock and warp knitted fabric.

24. The method of claim 13, wherein the residue compounds are removed by vacuum annealing.

25. The method of claim 24, wherein the vacuum annealing is performed at a temperature of less than or equal to 100° C.

* * * * *